United States Patent
Blomgreen et al.

(10) Patent No.: US 9,458,366 B2
(45) Date of Patent: Oct. 4, 2016

(54) ADHESIVE COMPRISING PARTLY HYDROLYZED PROTEINS AND METAL SILICATES

(71) Applicant: Bollerup Jensen A/S, Tarm (DK)

(72) Inventors: Mette Bjerregaard Blomgreen, Spjald (DK); Michael Østerby, Vejle (DK); John Mark Lawther, Roskilde (DK)

(73) Assignee: Bollerup Jensen A/S, Tarm (DK)

( * ) Notice: Subject to any disclaimer, the term of this patent is extended or adjusted under 35 U.S.C. 154(b) by 37 days.

(21) Appl. No.: 14/366,120

(22) PCT Filed: Dec. 21, 2012

(86) PCT No.: PCT/DK2012/050498
§ 371 (c)(1),
(2) Date: Jun. 17, 2014

(87) PCT Pub. No.: WO2013/091659
PCT Pub. Date: Jun. 27, 2013

(65) Prior Publication Data
US 2014/0363614 A1   Dec. 11, 2014

(30) Foreign Application Priority Data

Dec. 23, 2011   (DK) ................................ 2011 70755

(51) Int. Cl.
| | | |
|---|---|---|
| *C09J 189/00* | (2006.01) | |
| *B32B 37/12* | (2006.01) | |
| *B32B 21/14* | (2006.01) | |
| *B32B 21/13* | (2006.01) | |
| *B32B 21/02* | (2006.01) | |
| *C08K 3/34* | (2006.01) | |
| *C09J 1/02* | (2006.01) | |

(52) U.S. Cl.
CPC .............. *C09J 189/00* (2013.01); *B32B 21/02* (2013.01); *B32B 21/13* (2013.01); *B32B 21/14* (2013.01); *B32B 37/1284* (2013.01); *C08K 3/34* (2013.01); *C09J 1/02* (2013.01); *B32B 2255/08* (2013.01); *B32B 2317/16* (2013.01); *C09J 2400/16* (2013.01); *C09J 2489/00* (2013.01); *Y10T 428/24066* (2015.01); *Y10T 428/249925* (2015.04); *Y10T 428/31989* (2015.04)

(58) Field of Classification Search
CPC ...... C09J 189/00; B32B 37/12; B32B 21/14; B32B 21/13; B32B 21/02
See application file for complete search history.

(56) References Cited

U.S. PATENT DOCUMENTS

| | | | |
|---|---|---|---|
| 2,810,657 A | | 10/1957 | Preusser |
| 2,894,847 A | * | 7/1959 | Wright ................... C09J 189/00 106/157.7 |
| 3,392,038 A | | 7/1968 | Teyral |
| 3,925,289 A | * | 12/1975 | Sakato ................... C08F 263/04 428/151 |
| 4,352,692 A | | 10/1982 | Krinski et al. |
| 5,766,331 A | * | 6/1998 | Krinski ................... D21H 19/50 106/128.1 |
| 2005/0166796 A1 | | 8/2005 | Sun et al. |

FOREIGN PATENT DOCUMENTS

EP    0 838 513 A2    4/1998

OTHER PUBLICATIONS

Rutherfurd, Shane M. "Methodology for Determining Degree of Hydrolysis of Proteins in Hydrolysates: A Review" Journal of AOAC International, 2010, pp. 1515-1522, vol. 93, No. 5.
International Search Report for PCT/DK2012/050498 dated May 29, 2013.

* cited by examiner

*Primary Examiner* — Daniel Lee
(74) *Attorney, Agent, or Firm* — Knobbe, Martens, Olson & Bear LLP

(57) ABSTRACT

The present invention relates to a liquid adhesive composition comprising a partly hydrolyzed protein component, having a degree of hydrolysis (DH) in the range 0.2-2; a metal silicate component; optionally, an exogenic protein hydrolyzing component; and wherein the liquid adhesive composition has a solid content in the range 15-80% by weight.

18 Claims, 1 Drawing Sheet

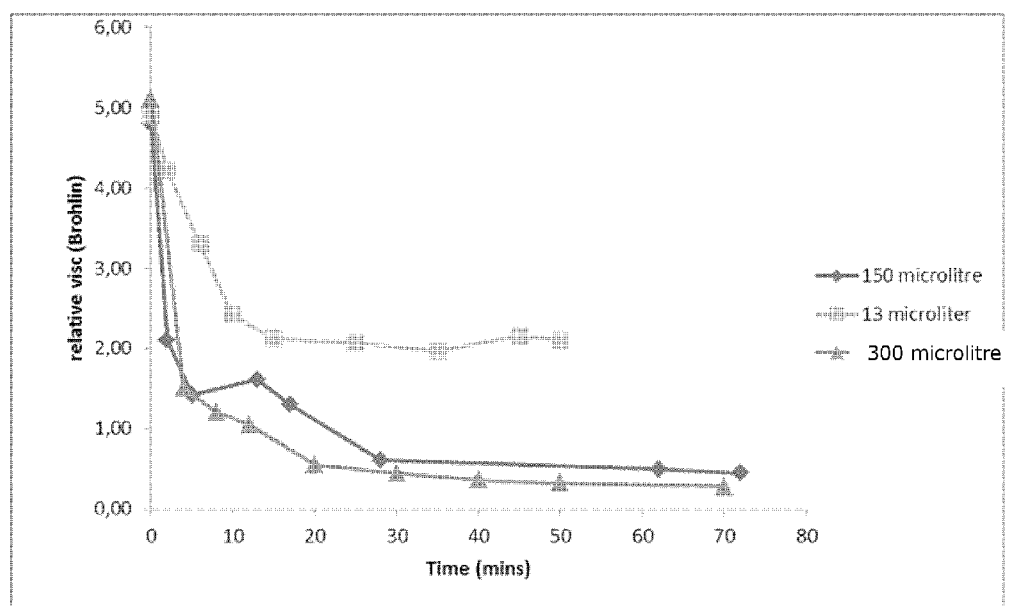

ADHESIVE COMPRISING PARTLY HYDROLYZED PROTEINS AND METAL SILICATES

CROSS REFERENCE TO RELATED APPLICATIONS

This application is a U.S. National Phase Application of PCT International Application Number PCT/DK2012/050498, filed on Dec. 21, 2012, designating the United states of America and published in the English language, which is an International Application of and claims the benefit of priority to Danish Patent Application No. PA 2011 70755, filed on Dec. 23, 2011. The disclosures of the above-referenced applications are hereby expressly Incorporated by reference in their entireties.

TECHNICAL FIELD OF THE INVENTION

The present invention relates to an adhesive comprising partly hydrolyzed proteins and metal silicates. In particular the present invention relates to environmental friendly and non-toxic adhesives comprising partly hydrolyzed proteins and metal silicates.

BACKGROUND OF THE INVENTION

Traditionally, many industrially utilized adhesives produced, for example those that are thermosetting or cure via polymer building and/or cross-linking, have as components various toxic and environmentally harmful components in order to provide
1) High solid content and at the same time provide enough adhesive strength and to lower the drying/curing time.
2) A viscosity which allows the adhesive to be pumped and spread.
3) Sufficient pot life, e.g. if the adhesive has to be stored before use.
4) Water resistance.
5) Sufficient bond strength.

For some years the adhesive industry has been under certain kind of pressure to reduce the content of harmful components in adhesives marketed until now.

Hence, there is a need in the industry for an improved adhesive which does not have the above disadvantages.

SUMMARY OF THE INVENTION

The present invention relates to a novel liquid adhesive composition and uses thereof. The present inventors have analysed the functional interaction between proteins and metal silicate (such as sodium silicate) to optimize the functionality of protein-metal silicate adhesives. Advantages of the partly hydrolyzed protein component of the present invention are that the viscosity is lowered in the adhesive while the network formation between peptides and the silicate may be improved due to emerging N-terminal $NH_3^+$- ends in the peptide fragments. Furthermore, selective hydrolysis can lead to the partial opening out of the polypeptide structure, enhancing opportunities for interaction with silicates and other peptides during thermally induced adhesive curing. In addition, by selecting a protein source having a relatively high content of lysine and arginine residues, the interaction with the silicate may be further improved since such amino acid residues may provide positive charges which may interact with the silicate (even under basic pH).

Thus, an object of the present invention is to provide a protein-silicate adhesive with improved bonding strength, while maintaining a low, or useful, viscosity during adhesive application. In particular, it is an object of the present invention to provide a protein-silicate adhesive having an optimized network formation between the protein and the silicate.

Thus, one aspect of the invention relates to a liquid adhesive composition comprising
  a partly hydrolyzed protein component, having a degree of hydrolysis (DH) in the range 0.01-20, and wherein the content of amino acid residues with side chains having pKa values of at least 8 and being predominately positively charged at pH values below that pKa value is at least 2% relative to the total content of amino acid residues present in the protein component;
  a metal silicate component;
  optionally, an exogenic protein hydrolyzing component; and
wherein the liquid adhesive composition has a solid content in the range 15-80% by weight.

In yet an aspect the invention relates to a liquid adhesive composition comprising
  a partly hydrolyzed protein component, having a degree of hydrolysis (DH) in the range 0.2-2, and;
  a metal silicate component;
  optionally, an exogenic protein hydrolyzing component; and
wherein the liquid adhesive composition has a solid content in the range 15-80% by weight.

Another aspect of the present invention relates to a process for producing a liquid adhesive composition according to the present invention comprising
  providing a protein component having a percentage of amino acid residues with side chains having pKa values of at least 8 and being predominately positively charged at pH values below that pKa value relative to the total content of amino acid residues of the protein residues of at least 2%;
  hydrolyzing the protein component to a degree of hydrolysis of 0.01-20 by the addition of a hydrolyzing agent;
  optionally terminating the hydrolyzation; and
  adding the metal silicate component, thereby providing and adhesive composition having a solid content in the range 15-80% by weight.

Yet another aspect of the present invention relates to a process for producing a liquid adhesive composition according to the invention comprising
  providing a first protein component;
  hydrolyzing the first protein component to a degree of hydrolysis of 0.2-2 by the addition of a hydrolyzing agent;
  optionally terminating the hydrolyzation; and
  adding the metal silicate component, thereby providing an liquid adhesive composition having a solid content in the range 15-80% by weight.

Yet another aspect of the present invention is to provide a product comprising a dry adhesive composition, the dry adhesive composition comprising
  a partly hydrolyzed protein component, having a degree of hydrolysis in the range 0.01-20, and wherein percentage of amino acid residues with side chains having pKa values of at least 8 and being predominately positively charged at pH values below that pKa value relative to the total content of amino acid residues of the protein residues is at least 2%;
  a metal silicate component; and
  optionally, an exogenic protein hydrolyzing component.

A further aspect relates to a product comprising a dry adhesive composition, the dry adhesive composition comprising
- a partly hydrolyzed protein component, having a degree of hydrolysis in the range 0.2-2;
- a metal silicate component; and
- optionally, an exogenic protein hydrolyzing component.

Still another aspect of the present invention is to provide a process for providing a product comprising at least two parts adhered at least partly together by a liquid adhesive composition according to the present invention comprising
- providing at least two parts which are to be adhered at least partly together,
- providing a liquid adhesive composition according to the invention,
- at least partly adhering the at least two parts together by positioning the adhesive between the two at least parts, and
- pressing the at least two parts together.

Another aspect relates to a liquid adhesive composition obtainable by a process according to the present invention.

A further aspect relates to a product obtainable by a process according to the present invention.

Yet a further aspect relates to the use of a liquid adhesive composition according to the present invention for adhering at least two objects at least partly together.

An aspect also relates to the use of a partly hydrolyzed protein component, having a degree of hydrolysis in the range 0.2-2, in an adhesive composition comprising metal silicate.

An aspect also relates to a kit of parts comprising
- a partly hydrolyzed protein component, having a degree of hydrolysis in the range 0.2-2;
- a metal silicate component;
- optionally, an oxidant;
- optionally, a crystallization agent; and
- optionally a filler.

SHORT DESCRIPTION OF THE FIGURES

FIG. 1

FIG. 1 shows viscosity changes of a soy protein source after addition of different levels of alkalase enzyme.

The present invention will now be described in more detail in the following.

DETAILED DESCRIPTION OF THE INVENTION

Adhesive Composition

An aspect of the present invention relates to a liquid adhesive composition comprising
- a partly hydrolyzed protein component, having a degree of hydrolysis (DH) in the range 0.01-20, and wherein the content of amino acid residues with side chains having pKa values of at least 8 and being predominately positively charged at pH values below that pKa value is at least 2% relative to the total content of amino acid residues present in the protein component;
- a metal silicate component;
- optionally, an exogenic protein hydrolyzing component; and
wherein the liquid adhesive composition has a solid content in the range 15-80% by weight.

In yet an aspect the invention relates to a liquid adhesive composition comprising
- a partly hydrolyzed protein component, having a degree of hydrolysis (DH) in the range 0.2-2, and;
- a metal silicate component;
- optionally, an exogenic protein hydrolyzing component; and
wherein the liquid adhesive composition has a solid content in the range 15-80% by weight.

To be able to have an adhesive composition which may be commercially interesting several requirements may be fulfilled depending on the specific use.

One or more of the following features may be relevant for the adhesive of the present invention to meet:
1) A solid content of at least 15%. The high solid content is important to provide enough adhesive strength and to lower the drying/curing time.
2) A viscosity which allows the adhesive to be pumped and spread, preferably below 1200 cps or even more preferably below 600 cps.
3) Long pot life, e.g. if the adhesive has to be stored before use.
4) Low toxicity, e.g. by being formaldehyde free.
5) Fire resistance.
6) Water resistance.
7) High bond strength, preferably an Internal Bond Strength ("IB") of at least 0.5 N/mm2 (MPa) and/or a Shear strength of at least 2.5 N/mm2 (MPa). The exact desired strength depends on the use.

By using a partly hydrolyzed protein fraction several of the important features of adhesives may be enhanced. Besides lowering the viscosity of the pre-cured adhesive formulation, other effects may take place, which may be important in relation to the interaction with the metal silicate. When the protein is hydrolyzed into peptides, new $NH_3^+$ N-terminals emerge, which, without being bound by theory, may improve binding to the silicate and improve the network during adhesion. This effect is further strengthened by using a protein fraction having a relatively high content of amino acid residues with side chains having pKa values of at least 8 and being predominately positively charged at pH values below that pKa value (such as lysine and arginine residues, which are the only natural amino acids which are substantially protonated under basic conditions and are therefore able to interact with the silicate under these basic pH levels). In addition, by cleaving the protein component into peptide fragments, the overall structure of the proteins are opened, thereby allowing further interactions between the silicate and the positively charges amino acid residues. Thus, an object of the present invention is to provide a protein-silicate adhesive having an optimized network formation between the protein and the silicate, and fulfils one or more of the requirements to an adhesive as previously described.

Thus, in an embodiment the content of amino acid residues with side chains having pKa values of at least 8 and being predominately positively charged at pH values below that pKa value is at least 2% relative to the total content of amino acid residues present in the protein component.

The degree of hydrolysis (DH) of a protein component is normally determined via the "pH stat" method, wherein liberated groups due to hydrolysis are titrated. The cleavage of a peptide bond releases two ionic groups: a carboxylic acid group and an amino group. At pH between 6-9, carboxylic groups will be fully ionized, but amino groups will be only partially protonated. Hence the hydrolysis of proteins in this pH region will lead to a net release of $H^+$ and the pH will drop. The continuous titration back to original pH, and the measurement of base consumed, gives a measure of the DH. This is the basis of the pH-stat technique which has been used widely in the monitoring of Degree of Hydrolysis in food protein processing. The automated monitoring of pH and pH adjustment are standard practice these days in industrial plant, allowing DH monitoring in itself to be partially automated.

Alternatively the degree of hydrolysis may be determined by the TNBS reaction, ninhydrin reaction, the fluorescamine reaction and formol titration: all evaluate released amino groups by comparing the amounts of free amino groups before and after hydrolysis. The first three methods are spectrophotometric techniques, whereas the fourth is a potentiometric technique.

Thus, in an embodiment the degree of hydrolysis of the hydrolyzed protein component is in the range 0.1-20, such as 1-20, such as 1-15, such as 1-10, such 1-5, such as 1-3, such as 2-10, such as 3-10, such as 4-10, such as 5-10, such as 0.1-5, such as 0.1-4, such as 0.1-3, such as 0.1-2, such as 0.5-5, such as 1-5, such as 1-3, such as 0.5-1, or such as 1-2. In another embodiment the degree of hydrolysis (DH) of the hydrolyzed protein component is in the range 0.3-2, such as 0.4-2, such as 0.5-2, such as 0.6-2, such as 0.3-1.8, such as 0.3-1.5, such as 0.3-1.2, such as 0.3-1, such as 0.3-0.9, or such as 0.4-0.7.

Different hydrolyzed protein component may be mixed to form the hydrolyzed protein component according to the present invention. Alternatively unhydrolyzed protein may be added during the hydrolysis step. Both these steps will result in different DH in the different protein components. Similarly, the DH may vary within a protein fraction since different parts are hydrolyzed with different speeds.

Thus, in an embodiment the degree of hydrolysis is the average degree of hydrolysis of the protein component.

In some more specific embodiment the liquid adhesive composition comprises
- 15-50% (w/w) of a partly hydrolyzed protein component, having a degree of hydrolysis (DH) in the range 0.2-2, and;
- 10-30%/w/w) a metal silicate component;

OR
- 20-40% (w/w) of a partly hydrolyzed protein component, having a degree of hydrolysis (DH) in the range 0.2-2, and;
- 7-20%/w/w) a metal silicate component;

OR
- 15-50% (w/w) of a partly hydrolyzed protein component, having a degree of hydrolysis (DH) in the range 0.2-2, and;
- 10-30%/w/w) a metal silicate component;
- 0.1-3% by weight Sodium Peroxide; and
- 0.1-2% lime.

Lime may also be added as a saturated solution, of which the solution is added at levels between 5-10% of the total liquid formulation Additional Components Different further components may be added to the adhesive to increase its performance.

Fungus may be a problem for protein based adhesives. Thus, in an embodiment the adhesive further comprises a fungicide, such as Propiconazole. Biocides commonly utilized in wood treatment, with fungicidal activity, are stable at the hot-pressing temperatures employed (100-140° C.) and at pH levels between 3 and 12. One example is Propiconazole. Thus, in another embodiment the fungicide is are stable at the hot-pressing temperatures employed (100-140° C.) and at pH levels between 3 and 12.

Co-components may increase adhesive strength. Thus, in an embodiment the adhesive further comprises a co-components such as lime (Ca-hydroxide).

An activating oxidant may also increase adhesive strength. Thus, in an embodiment the adhesive further comprises an oxidant such as Na peroxide (Sodium peroxide), Hydrogen peroxide, Laccase enzyme (phenolic cross-linking catalyst with $O_2$).

In the example section adhesives comprising both lime and Na peroxide have been tested. Thus, in yet an embodiment the adhesive further comprises both an co-component and an oxidant. This could be lime and Na peroxide.

A filler may also be added to the adhesive composition to increase the solid content and lower the moisture content. An advantage is faster curing time. Thus, in an embodiment the adhesive further comprises a filler, such as an inorganic filler. In yet an embodiment the filler is selected from the group consisting of kaolinite, myanit and feldspars, montmorillonite, nanoclays, titanium dioxides, and silica particles including silica nanoparticles.

In another embodiment the solid content of the metal silicate in the adhesive composition is in the range 2%-60% (w/w), such as in the range 5-40%, such as in the range 4%-30%, such as in the range 10-40%, such as in the range 15-40%, such as in the range 20-40%, such as in the range 30-40%, such as in the range 5-30%, or such as in the range 7-20%.

The tested ranges in the example section are from 8%-15% in SPI based formulations. Best performance noted at 9-11% sodium silicate dry matter basis in final (ie liquid and applied) glue mixes. An example of the tested sodium silicate are a Bollerup Jensen Type "36" having a dry solids content of 33-34%.

The solid content of the partly hydrolyzed protein component may vary within a adhesive composition. Thus, in an embodiment the solid content of the partly hydrolyzed protein component in the composition is in the range 5-40% (w/w), such as in the range 10-40%, such as in the range 15-40%, such as in the range 20-40%, such as in the range 30-40%, such as in the range 5-30%, or such as in the range 5-20%.

Since the solid content of the individual components may vary, the overall solid content may also vary. Thus, in an embodiment the liquid adhesive composition has a solid content in the range 15-80% (w/w), such as in the range 15-70%, such as in the range 20-60%, such as is in the range 5-40%, such as in the range 10-40%, such as in the range 15-40%, such as in the range 20-40%, such as in the range 30-40%, such as in the range 5-30%, or such as in the range 5-20%. An example of a composition could be 45-50% protein, 20% sodium silicate and 2% Na per.

The protein component may be hydrolyzed by different protein hydrolyzing agents. In the present context a protein hydrolyzing agent is an agent which is able to hydrolyze proteins. Thus, an aspect of the present invention relates to a liquid adhesive composition, wherein the exogenic protein hydrolyzing component is an enzymatic agent and/or a chemical agent.

Different types of enzymatic hydrolyzing agents exist. Thus, in another embodiment the enzymatic agent is selected from the group consisting of serine proteases, threonine proteases, cysteine proteases, aspartate proteases, metalloproteases, glutamic acid proteases and combinations thereof. In a more specific embodiment the protease is an endoprotease. In an even more specific embodiment the endoprotease is selected from the group consisting of "alcalase"-subtlisin, "Neutrase", pepsin, Chymotrypsin, trypsin, papain, Elastase and combinations thereof. Alkalase and Neutrase (or Neutralase) are both well known endopeptidase compositions produced by Novozymes. Thus, the enzymatic agent may be a composition of one or more protease enzymes. Preferably alkalase is used (see examples).

In another embodiment the protease is substantially inactive at pH above pH 9, such as above pH 8, such as above ph 7, such as above pH 6 or such as above pH 5. For example pepsin denatures at pH above 5. Thus, a protease according to the present invention may be inactivated by the addition of the metal silicate component which is normally alkaline. In this way the degree of hydrolysis may be controlled, while providing the adhesive according to the invention. When an enzymatic exogenic protein hydrolyzing component is used, it may be detected in the final adhesive composition, since traces of the enzymes may be present.

The exogenic protein hydrolyzing component may also be a chemical agent. Thus, in an embodiment the chemical agent is selected from the group consisting of mineral acids such as sulphuric acid, hydrochloric acid, phosphoric acid, nitric acid, and oxidants such as hydrogen peroxide and sodium peroxide or combinations thereof. When the exogenic protein hydrolyzing component is an chemical agent, it may not be detected in the final adhesive composition, since compounds such strong acids or $H_2O_2$ may have been decomposed to other compounds. For example $H_2O_2$ decomposes to $O_2$ and water which most likely cannot be detected in the liquid adhesive composition after manufacture.

The pH of the adhesive composition is preferably above 7 since metal silicates normally polymerize very fast under acidic conditions. Thus, in an embodiment the liquid adhesive composition has a pH in the range 7-13, such as 9-13, such as 10-13, such as 11-13, such as 7-11 such as 7-10, such as 7-9.5, such as 7-9, such as 7-8.5, such as 7-8, such as 7.5-9, such as 7.5 to 8.5 such as 7.5-8 or such as 8-9.

At pH up to 8 further positive charges will be available in the peptides from the $NH_3^+$-terminal ends of the peptide fragments (pKa around 8). Thus, a pH in the range 7-9 may be optimal e.g. 7-8 or 8-9. However this is a tradeoff between gelefication of the sodium silicate and keeping the N-terminal ends protonated.

Since an adhesive may not be used directly after it has been prepared, it would be advantageous if the liquid adhesive was stable for a longer period of time. Thus, in an embodiment the liquid adhesive composition has a pot life of at least 1 day such as at least 2 days, such as at least 3 days, such as in the range 1-30 days such as in the range 3-30 days, such as 3-20 days such as 1-10 days. Pot-life is defined as the time the fully formulated, thermosetting glue preparation retains its processing properties (such as viscosity, pumpability, spreadability and sprayability) after final preparation (mixing of components, adding of catalysts, etc.)

For the liquid adhesive composition to be industrial applicable it is important that it is pumpable, spreadable and/or sprayable. Thus, in a further embodiment the liquid adhesive composition has a viscosity in the range 500-6000 mPa·sec measured at 20° C. at a total solid content of about 50%, in an aqueous solution, such as 50-3000 mPa·sec, such as 100-2000 mPa·sec, such as 100-1000 mPa·sec, or such as 100-700 mPa sec Said viscosity is measured at average sea-level pressure, such as 101.325 kPa.

The protein component may be obtained from different sources. Thus, in an embodiment the protein component is selected from plant derived protein fractions, milk derived protein fractions, blood derived protein fractions and combinations thereof.

In another embodiment the plant derived protein fractions are selected from the group consisting of soya bean fractions, lupin-seed fractions, wheat, Rapeseed protein isolate (RPI) and other cereal gluten fractions, wheat bran derived fractions, wheat germ derived fractions, oat kernel albumin and globulin fractions, rapemeal fractions, pea and other legume seed protein rich fractions, fractions emanating from the biorefining of cereal straws, cereal brans and grasses, fractions derived from olive residues and combinations thereof.

Preferably a soya protein isolate (SPI) is used, alternatively rapeseed protein isolate.

Glutens (e.g. wheat glutens) are proteins left behind after the washing of starch and soluble materials out from wheat flour. Isolated gluten generally consists of around 75% protein, which is that insoluble or not dispersible in water and that can "agglomerate" during the flour washing procedures. They are regarded as storage proteins. Gluten is simplistically defined in terms of two "major components": the Gliadins and the Glutenins. The Gliadins are a portion of the gluten that is soluble in 70% ethanol: a so-called "prolamin". The remainder is "glutenin". Isolated wheat glutens are typically (in terms of total protein), around a 50:50 mix of these components.

Gliadins are hydrophobic proteins mainly consisting of a single polypeptide chain that tends to be folded into an approximately spherical conformation in aqueous suspension. This is due to a limited amount of intramolecular disulphide bonding and association of hydrophobic regions on the protein chain. There are 4 main types of gliadins, 3 of which ($\alpha$, $\beta$, $\gamma$ gliadins) have molecular weights of around 30 kD. The $4^{th}$ ($\omega$ gliadin) has a molecular weight close to 60 kD. Gliadins are extremely rich in Glutamic acid residues (40-50%), of which around 90% is present as glutamine. They are also rich in proline residues. This profoundly affects the secondary structure of the protein via the hindrance of formation of $\alpha$-helical structures within the chain. Gliadins are also very poor in basic amino acids such as lysine. Because of these characteristics, gliadins are very hydrophobic proteins and are insoluble in water at normal pH values. Gliadins are actually more hydrophobic than the "glutenins".

The residual storage proteins remaining after ethanolic extraction of the gliadins from wheat gluten, are known as the glutenins. The glutenins consist of "gliadin like" sub-units which are joined by inter-chain (ie inter-molecular) disulphide bonds. The "Glutenin Macro polymers" ("GMP") come at a range of molecular sizes, from around 150 kD up to even 5000 kD. When the glutenins are subjected to reduction and cleavage of disulphide bonds, they are seen to be composed of a mixture of "Low molecular weight sub-units" ("LMW-GS") and high molecular weight sub-units ("HMW-GS"). Molecular weights of LMW-GS can be as low as 12 kD, whilst HMW-GS are up to 134 kD.

Disulphide links tend to bind these sub-units in blocks via inter-molecular bonding. Hydrogen and other secondary bonding also play a part in the association.

The amino-acid composition of the glutenin material is similar to that of the closely related gliadins. In general, the glutenin storage proteins tend to contain a slightly lower content of glutamic acid/glutamine and proline, and a slightly higher amount of basic amino acid such as lysine, as compared to the gliadins.

Glutenin subunits tend to be of more hydrophilic character as compared to gliadins. They also possess some intramolecular disulphide link, as in the gliadins.

To exploit this inherent hydrophobicity of e.g. gliadin and/or glutenin in gluing applications, it may be necessary to open out the structure and this may be facilitated by the initial step of breaking the intra-molecular S—S bonds between cysteine residues. Further denaturation at a suitable stage may open out the near spherical initial conformation to a higher degree. As previously mentioned, partly hydrolysis may also be employed to open up the conformation. To improve network formation metal silicate is added to the partly hydrolyzed protein component. As also mentioned previously, metal silicates are also important for improving fire resistance of the final product. Final hot-pressing or thermal treatment can be used to produce a thermoset system.

Thus, in yet another embodiment the cereal glutens are gliadin and/or glutenin e.g. from wheat. In yet another embodiment, these cereal glutens, gliadin and/or glutenin are combined with polypeptides and/or peptides that are rich in lysine and arginine, such asthose derived from legume seeds such as lupin, soy, pea or other bean, rapeseed or rapeseed meal, or from milk or animal blood. In the present context the term "rich" in lysine and arginine mean having a content above 2% relative to the other amino acid residues present in the protein component such as 2-20%, such as 5-20%, such as 10-20%, such as 2-15%, such as 2-10%. Transglutaminase can optionally be used as a catalyst to bond these peptides or polypeptides to the cereal gluten derived polypeptides.

In yet another embodiment the blood derived protein fractions are selected from the group consisting of common slaughterhouse blood, including pig blood, cow blood, sheep blood, chicken blood, turkey blood and combinations thereof.

In yet a further embodiment the milk derived protein fractions are selected from the group consisting of casein fractions and those derived from whey, including beta lactoglubulins, alpha-lactalbumin, serum albumins and combinations thereof.

Different types of metal silicates exist, which may be used in the present invention. Thus, in an embodiment the metal silicate is selected from the group consisting of sodium silicate, potassium silicate and lithium silicate.

The table below shows examples of different types of sodium silicate and potassium silicate and their properties. These metal silicates may be used in the adhesive compositions of the present invention.

| Type of metal silicate | ° Be | visc. mPa·s | Solid content % | GV % | pH |
|---|---|---|---|---|---|
| Sodium type 36 | 36.3 | | 33.5 | 3.2-3.4 | 12 |
| Sodium Type 37/40 | 38.3 | 48.3 | 36 | 3.2-3.4 | 12 |
| Sodium Type 44 | 44.3 | 52.8 | 38.4 | 2 | 14 |
| Sodium Type 46 | 46.3 | 72.3 | 40.3 | 2 | 14 |
| Sodium Type 50 | 50.3 | 200 | 44.3 | 2 | 14 |
| Potassium Type 4009 | 40 | 46.6 | 39.4 | 2 | 13 |

° Be = Baume, GV = weight/weight ratio between $SiO_2$ and $Na_2O$ or between $SiO_2$ and $K_2O$.

Preferably, the metal silicate may be selected from the group consisting of sodium silicate and potassium silicate, more preferably the metal silicate is sodium silicate. In yet an embodiment the metal silicate is a sodium silicate type 36, a sodium silicate type 37/40, a sodium silicate type 44, sodium silicate type 46, sodium silicate type 48, sodium silicate type 50, a potassium silicate type 50, a potassium silicate type 54, or a potassium silicate type 4009. In yet an embodiment the metal silicates have a silica to metal oxide weight ratio of between about 1.5:1 and 4.0:1 and a solids content between about 30% and 55% by weight.

Sodium silicate (water glass) is a member of the family of soluble sodium silicates and is considered the simplest form of glass. Water glass is derived by fusing sand and soda ash; it is non-combustible with low toxicity. It may be used as catalysts and silica gels; soaps and detergents; adhesives; water treatment; bleaching and sizing of textiles and paper pulp; ore treatment; soil solidification; glass foam; pigments; drilling muds; binder for foundry cores and molds; waterproofing mortars and cements; and surface impregnating wood.

Without being bound by theory, the interaction between the protein and the metal silicate may be improved if the protein component comprises a high degree of positively charged side chains on the amino acid residues. It may be possible to chemically or enzymatically modify the proteins/peptides to introduce further side chains with pKa values above 8 (besides the naturally occurring basic amino acids and the N-terminal amino group).

Transglutaminases are a family of enzymes that catalyze the formation of a covalent bond between a free amine group (e.g., protein- or peptide-bound lysine) and the gamma-carboxamid group of protein- or peptide-bound glutamine. Bonds formed by transglutaminase tend to be resistant to protease hydrolysis. By using transglutaminases further basic groups and peptides rich in basic amino acid residues may be introduced in the protein component. Transglutaminases may also be used to covalently link the different peptide fractions to induce network formation. The skilled person may use other enzymatic or chemical means to attach further basic groups to the protein component.

The protein fraction may also be de-amidated or partially de-amidated to increase solubilities. Thus, in an additional embodiment the protein component is de-amidated or partly de-amidated.

The pKa value (or Ka) is an acid dissociation constant, (also known as acidity constant, or acid-ionization constant) is a quantitative measure of the strength of an acid in solution. It is the equilibrium constant for a chemical reaction known as dissociation in the context of acid-base reactions. At a pH identical to the pKa value, theoretically 50% of the molecules will be in its acidic form and 50% will be in its basic form. A pKa value may be the transition between a negative charge and a neutral state or it may be the transition between a neutral state and a positive charge. At a pH below the pKa value of a molecule (or specific group of a molecule in question), the molecule will predominantly be protonated, whereas at a pH above the pKa value the molecule will predominantly be de-protonated. A molecule may have more than one pKa value. Such molecules are called zwitterionic molecules. The pKa value may be determined by a range of different methods, depending e.g. on the solubility of the molecule. The indicated pKa values for amino acid groups are standard values provided by text books. The person skilled in the art is able to establish such values for other molecules under standard conditions such as in an aqueous solution. pKa values may depend on temperature, ionic strength and the microenvironment and the ionizable group. Sirius Analytical provides instruments for performing such analysis.

Thus, in an embodiment the protein component has a content of amino acid residues with side chains having pKa values of at least 8 and being predominately positively charged at pH values below that pKa value is in the range 2-40% relative to the other amino acid residues present in the protein component, such as 2-30%, such as 2-30%, such as 2-20%, such as 5-20%, such as 8-20%, such 10-20%, or such as 2-10%.

Natural amino acid residues which may have protonated side chains under basic conditions are arginines and lysines. In addition N-terminal fragments may also have a protonated amino group. In the present context the N-terminal amino group is also considered a side chain. Thus, in an embodiment the amino acid residues with side chains having pKa values of at least 8 and being predominately positively charged at pH values below this pKa value is selected from the group consisting of arginine residues, lysine residues and N-terminal amino acid residues.

In a further embodiment the content of lysine residues, arginine residues and/or N-terminal amino acid residues relative to the other amino acid residues present in the protein component is the range 1-30%, such as 1-20%, such as 5-20%, such as 8-20%, such 10-20%. In yet a further embodiment the content of lysine residues and/or arginine residues relative to the other amino acid residues present in the protein component is the range 1-20%, such as 5-20%, such as 8-20%, such 10-20%. For example casein may have around 14% of lysine and arginine residues, whereas BSA has a content of lysine and arginine residues around 14%. The person skilled in the art may identify other protein sources which has a higher content of lysine and arginine residues.

The solid content of the adhesive is important, since it is important to have enough molecules present in the adhesive to supply adhesion during use. On the other hand increasing the solid content will also increase the viscosity. Thus, in an embodiment said composition has a solid content in the range 20-80% by weight, such as 30-80% by weight, such as 40-80% by weight, such as in the range 50-80%, such as 60-80%, such as 40-70%, such as 40-60%, such as 40-50%.

In yet an embodiment the solid content of the protein component is in the range 20-40% by weight, such as in the range 25-40%, or such as 25-35%. In another embodiment the solid content of the metal silicate is in the range 20-60% by weight, such as in the range 25-60%, or such as 25-50%.

The adhesive composition may comprise further substances to increase stability and/or adhesion. Thus in a further embodiment the liquid adhesive composition further comprises calcium hydroxide and/or one or more metal salts.

The weight:weight ratio between the metal silicate and the protein (metal silicate:protein) is important for providing enough strength. Thus, in an embodiment the ratio between the metal silicate and the protein (metal silicate:protein) on a weight:weight basis, is above 0.5, such as above 1, such as above 1.5, such as above 2 or such as above 2.5.

Formaldehyde has been used extensively in adhesive compositions, since it provides cross-linking of e.g. proteins. However, formaldehyde is also considered toxic and is therefore an inappropriate component in adhesives, especially for indoor use. Thus, in an embodiment the liquid adhesive composition is substantially or completely free from formaldehyde.

Different types of cross-linkers may be used in the present invention.
1) Enzymatic cross-linkers. Such cross-linkers forms covalent bonds between peptides, but is not necessarily part of the network itself.
2) Chemical cross-linkers. Such cross-linkers induce covalent bonds between the peptides or between peptides and silicate. Formaldehyde is an example of such cross-linker. Other examples are Glutaraldehyde and citric acid.
3) Organic or inorganic network forming cross-linkers. Such linkers form network between peptides and metal silicates e.g. through electrostatic interactions. Sodium silicate may be considered such type of binder (between peptides).

In certain instances it may be appropriate to increase the binding between the organic component (protein) and the inorganic component (metal silicate) by using one or more of the above listed types of cross-linkers. However, cross-linkers may be expensive and have safety issues. Thus, if sufficient binding can be provided in the adhesive composition according to the present invention, a cross-linker can be dispensed (besides the metal silicate). Thus, in another embodiment the liquid adhesive is free from cross-linker, with the proviso that the cross-linker is not a metal silicate.

On the other hand for certain adhesive compositions a further cross-linker may be used. Thus, in an embodiment the liquid adhesive composition further comprises a cross-linker. Different types of cross-linkers may be used. Thus, in yet another embodiment the cross-linker is selected from the group consisting of enzymatic cross-linkers, chemical cross-linkers, organic or inorganic network forming cross-linkers, or combinations thereof. Examples of cross-linkers are Silane cross-linker candidates—Dynasilan Hydrosyl 1151 and Dynasylan Hydrosil 2776 (from Evonik).

Chemical cross-linkers—Hexamethylene Diamine, Maleic Anhydride, The Imidoesters: Dimethyl Adipimidate (DMAD), Dimethyl Suberimidate (DMSD); also the documented protein cross-linker Glutaraldehyde.

Enzymatic cross-linkers—Transglutaminase (catalyses cross-linking between Lysine —NH2 groups and Glutamine residues in polypeptide chains)

In another aspect the present invention relates to a process for producing a liquid adhesive composition according to the present invention comprising
  providing a protein component having a percentage of amino acid residues with side chains having pKa values of at least 8 and being predominately positively charged at pH values below that pKa value relative to the total content of amino acid residues of the protein residues of at least 2%;
  hydrolyzing the protein component to a degree of hydrolysis of 0.01-20% by the addition of a hydrolyzing agent;
  optionally terminating the hydrolyzation; and
  adding the metal silicate component, thereby providing and adhesive composition having a solid content in the range 15-80% by weight.

In yet an aspect the invention relates to a process for producing a liquid adhesive composition according to the invention comprising
  providing a first protein component;
  hydrolyzing the first protein component to a degree of hydrolysis of 0.2-2 by the addition of a hydrolyzing agent;
  optionally terminating the hydrolyzation; and adding the metal silicate component, thereby providing an liquid adhesive composition having a solid content in the range 15-80% by weight.

Further components may be added to the adhesive. Thus in yet an embodiment the process further comprising adding a crystallization agent and/or an oxidant and/or a filler.

The process may also comprise further addition of protein and/or hydrolyzation agent (such as alkalase) during the process. Thus, in an embodiment the process further comprising adding a second protein component to the hydrolyzed first protein component;
hydrolyzing the mixture of the first protein component and the second protein component to an average degree of hydrolysis of 0.2-2 by the addition of a hydrolyzing agent; and
optionally terminating the hydrolyzation.

These additional steps may be repeated 1-10 times, such as 1-5 times, such as 1-3 times or such as 2-4 times. In the example section this method has been tested.

As mentioned above, terminating the hydrolyzation may be performed by the addition of the metal silicate component since it preferably is basic. Thus, an additional step for terminating the hydrolysis may be dispensed. The hydrolyzation may also be terminated by the addition of a base, such as NaOH. In an embodiment enzymatic hydrolysis is terminated by heating, e.g. to 80° C. for 10 minutes depending on the enzymes used.

If the protein component comprises disulfide bonds it may be appropriate to break these bindings. Disulfide bonds may be broken by the addition of a reducing agent such as β-mercaptoethanol. Thus, in yet an embodiment a reducing agent is added to break disulfide bonds. To avoid reformation of original disulfide bonds at a later stage it may be advantageous to add free cysteines e.g. 10 mgs/g protein. Thus, in yet an embodiment free cysteines are added to inhibit reformation of disulfide bonds.

When the liquid adhesive according to the present invention has been used to adhere (glue) two components to each other the adhesive becomes part of a composite product. Thus, an aspect of the present invention relates to a product comprising a dry adhesive composition, the dry adhesive composition comprising a partly hydrolyzed protein component, having a degree of hydrolysis in the range 0.01-20, and wherein percentage of amino acid residues with side chains having pKa values of at least 8 and being predominately positively charged at pH values below that pKa value relative to the total content of amino acid residues of the protein residues is at least 2%;
a metal silicate component; and
optionally, an exogenic protein hydrolyzing component.

In an embodiment the ratio (weight/weight) between the metal silicate and protein in the dry adhesive composition is above 0.25 on a weight:weight basis, such as above 0.3, such as above 0.5, such as above 1, such as above 1.5, such as above 2 or such as above 2.5.

In another aspect the invention relates to a product comprising a dry adhesive composition, the dry adhesive composition comprising a partly hydrolyzed protein component, having a degree of hydrolysis in the range 0.2-2;
a metal silicate component; and
optionally, an exogenic protein hydrolyzing component.

The adhesive according to the present invention may be used to adhere (glue different products to each other. Thus, in an embodiment the product is selected from the group consisting of plywood, particle board, chip board, medium density fibreboard (MDF), LDF, HDF, oriented strand board (OSB), laminated veneer lumber (LVL), laminated strand lumber (LSL) and combinations thereof. The person skilled in the art may know other types of products which may be used such as other common wood based panels incorporating wood, or other lignocellulose, particles and fibres which may require a glue phase, such as paper or paper-like products.

When the adhesive is cured the moisture content is much lower than for the liquid adhesive. Thus, in an embodiment the dry adhesive has a moisture content below 10%, such as below 7%, e.g. below 5%, such as below 3%, such as below 2%, such as below 1%, such as below 0.5%.

As mentioned previously it may be favorable to avoid formaldehyde. Therefore, in yet an embodiment the dry adhesive is substantially or completely free from formaldehyde.

The present invention also provides a process for using the adhesive. Thus, in an aspect the invention relates to a process for providing a product comprising at least two parts adhered at least partly together by a liquid adhesive composition according to the present invention comprising providing at least two parts which are to be adhered at least partly together,
providing a liquid adhesive composition according to the invention,
at least partly adhering the at least two parts together by positioning the adhesive between the two at least parts, and
pressing the at least two parts together.

It is of course to be understood that further layers may be adhered using the process and adhesive according to the present invention.

To improve the bond strength it may be an advantage to cure the product for a certain period of time. Thus, in an embodiment, the process further comprising curing said product for a period of at least 1 minute, such as period in the range 1 minute to 2 hours, such as in the range 1 minute to 1 hour, such as 1 minute to 30 minutes, such as 1 minute to 15 minutes, such as 1 minute to 10 minutes, such as in the range 1 minute to 5 minutes. The curing step may be faster when the temperature is raised. Thus, in an embodiment said curing takes place at a temperature in the range 50-200° C., such as 75-200° C., such as 100-200° C., such as 50-175° C., such as 50-150° C., such as 50-125° C., such as 75-125° C. In another embodiment the pressing step is performed for 20 seconds to 5 minutes, such as 40 seconds to 5 minutes, such as 1-5 minutes, such as 20 seconds to 4 minutes, such as 20 seconds to 3 minutes, such as 1-3 minutes. In yet an embodiment the pressing step is performed at a temperature in the range 80-160° C., such as in the range 100-160° C., such as in the range 120-160° C., such as in the range 80-140° C., such as in the range 80-120° C., such as in the range 100-140° C., or such as in the range 100-150° C. In a preferred embodiment the pressing step is performed at 80-120° C. for 1-3 minutes.

Use of partly hydrolyzed protein component

The present inventors have found out that a hydrolyzed protein component with a narrow DH has beneficial effects in adhesive compositions. Thus, in an aspect the invention relates to the use of a partly hydrolyzed protein component, having a degree of hydrolysis in the range 0.2-2, in an adhesive composition comprising metal silicate.

In yet an aspect the invention relates to the use of the liquid adhesive according to the invention in a gluing process.

Kit if parts

The adhesive according to the present invention may be supplied as a composite adhesive which is not mixed until use. Thus, in an aspect the invention relates to a kit of parts comprising
- a partly hydrolyzed protein component, having a degree of hydrolysis in the range 0.2-2;
- a metal silicate component;
- optionally, an oxidant;
- optionally, a crystallization agent; and
- optionally a filler.

The partly hydrolyzed protein component and the metal silicate component may be mixed in advance. Thus in an embodiment the partly hydrolyzed protein component and metal silicate component are combined in a single component. In an embodiment the kit of part comprises both an oxidant and a crystallization agent.

In yet a further aspect the invention relates to a liquid adhesive composition obtainable by a process according to the present invention.

In an additional aspect the invention relates to a product obtainable by a process according to the present invention.

In yet an additional aspect the invention relates to the use of a liquid adhesive composition according to the present invention for adhering at least two objects at least partly together.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Example 1

Method for hydrolysis of plant proteins employed in glue preparation:

Plant protein is slurried in water at a concentration of 20% solids (e.g. 400 g in 2 L water per lab batch) with vigorous (overhead) mechanical stirring, placed in a stainless steel canister in a water bath, at a temperature of 50-70° C. (typically 65° C.)

The pH of the slurry is adjusted to 7.5 and alcalase enzyme, sourced from Novozymes (20-150 µl, diluted into 2 ml water) is then added to the stirring mix. The hydrolysis is monitored continuously using the pH-Stat method and the reaction is stopped at suitable DH via rapid rising of the temperature to 80° C. to deactivate the enzymes. To achieve DH of 0.1-1, lower enzyme doses are employed and hydrolysis times are kept low (minutes up to 1 hour). To achieve DH of 10 or more, times of greater than 1 hour and up to 3 hours are needed, depending on enzyme dosage and temperature.

Example 2

Hydrolysis of Protein Lowers the Viscosity of the Protein Component

Materials and methods

In the illustrated test cases, the protein suspension was 15% solids (Soy Protein Isolate: SPI) in water (75 g SPI and 425 g water) and hydrolysis was carried out at 65° C., using (three different dosages of) alkalase enzyme, in the pH range 7.5-8.5 (pH changes during the process). To achieve DH 0.7, the dosage of alkalase used was 13 µl, for DH 2.4, dosage was 150 µl and to achieve DH 5, 300 µl was used. Viscosity change was monitored using a BohlinVisco-88 dynamic plate viscometer. SPI was from Solae LLD, Soy protein Isolate: SUPRO 548. DH was measured using the pH stat method.

Results

The graph in FIG. 1 shows the viscosity changes with different concentrations of alkalase enzymes. In the lower dose case, DH 0.7 was reached within 30 mins of (alkalase) enzyme addition. In the second case the DH reached was 2.4. In the highest dose case, the DH approached 5. The viscosity dropped accordingly Conclusion This example illustrates that dispersion viscosity is readily and quickly lowered via the hydrolysis. The lowering of viscosity is interesting for glue formulating, enabling higher solids contents to be achieved at not-excessive viscosities, whilst maintaining good processing properties (pumpable, sprayable and easily stirred formulations) during glue application, and minimising water content in a hot-press curing phase. This can lead to board or panel "blowing" which cannot be tolerated in full industrial scale wood based panel production.

Example 3

Method for preparing and monitoring dispersions:

SPI (Solae LLD, Soy protein Isolate: SUPRO 548) (75 g) was added to 425 g water and brought to a partial solution/dispersion using an overhead mechanical stirrer. The mix was placed in a 65° C. water bath and the pH adjusted to 8.4 using 1 M NaOH solution. Alkalase endoprotease (supplied by Novozymes A/S) was added to the mix and hydrolysis was allowed to proceed for up to 90 minutes. During this time the relative viscosity was monitored using a Bohlin-Visco-88 dynamic plate viscometer.

A range of trials confirmed this trend: The DH could be controlled by enzyme dose within this range.

Results

Originally, it was thought that the lower viscosity (ie high DH, 5 or above) would be most interesting for developing adhesives, with greatest potential for raising formulation solids contents. To verify this wood block gluing trials with protein hydrolysed to DH values ranging from 0.1 (barely hydrolysed and still too viscous) up to 5, formulated into the "base test glue" formulation, were tested in relation to internal bond strength, viscosity of protein dispersion and viscosity of glue/adhesive composition.

The following glue composition was used in the test with varying DH for the protein source.

| Component | Mass | Solid content in liquid dispersion (%) | Solid content "in dry solids" (%) |
|---|---|---|---|
| SPI | 30 g | 14.2 | 56.7 |
| Na-Water glass type 36 | 60 g | 24.4 (dry silicate 8.8) | 38.6 |
| Water | 100 g | | |
| Lime solution | 20 g | 9.5 (dry Calcium Hydroxide) | 1.9 |
| Na peroxide | 1.5 g | | 2.8 |

The glue compositions were prepared in the following way:

SPI powder (Solae LLD, Soy protein Isolate: SUPRO 548) added to the water (use 1 liter glass beaker) with a good overhead mechanical mixer, to produce a smooth dispersion. The mixture was placed in a water bath at 65° C. and mixing continued for 15 mins until temp equilibrates. 25 mls 1M NaOH was added to adjust pH to close to 8.5.

The selected dosage (13 micro-litres produces a DH of 0.7 under these conditions, for example) of alkalase enzyme was then added and stirring continued. The viscosity drop was monitored. Stirring at 65° C. was continued for times ranging from for 25-90 mins. Typically 30 mins for glue preparation. The disperse mix was then removed from the water bath and the remaining glue components were added, with stirring, in the order: water glass, Lime solution, Na Per. The mix was then stirred for a further 15 minutes and then used.

Results

This results are illustrated in the table below:

| Soy Protein DH | Internal Bond Strength "IB"(N/mm$^2$ or "MPa") | Visc of make-up protein dispersion after 50 mins hydrolysis (cps) | Visc of glue formulation (20% solids) prior to application (cps) |
| --- | --- | --- | --- |
| Unhydrolysed | 0.8 | 600 | 950 |
| DH 0.4 | 0.75 | 350 | 570 |
| DH 0.7 | 0.7 | 210 | 350 |
| DH 2.4 | 0.2 | 60 | 115 |
| DH 5 | 0.15 | 32 | 90 |

Glues based on 15% protein solids content, total 20% solids content, on application. Glue was applied to Wood strips/blocks (5 cm×2.5 cm×0.5 cm) and pairs were glued together with curing in an oven at 120 C for 1 hour, under a 3 kg weight.

The glues prepared from protein hydrolysed to DH>2.3 showed insufficient strength in these tested formulations. An IB of at least 0.3-0.4 MPa is required by performance standards.

Later trails using veneers and much shorter curing times have shown much higher gluing strengths (shear strengths rather than IB), but the dependency on DH is mirrored.

Conclusion

Surprisingly the results showed that the required bond strength were maintained for adhesives with a DH of both 0.4 and 0.7 while the viscosity were lowered. For a DH of 2.4 and 5 the viscosity was also lowered but the bonding strength was below the required standard.

Example 4

Veneer Strip Tests.

Glue formulation produced using SPI hydrolysed to DH 0.7 and 2.5, with total 20% solids content was tested for shear strength after hot-press-curing in a 2-strip veneer system.

Materials and methods 100 mm×40 mm×2 mm pine veneer strips were used as basis test wood. Glue was applied by brushing at an industry standard level for veneer gluing: (200 g/m$^3$)

Pairs of strips were hot-pressed together, completely overlapping 50 mm along their lengths, leaving adequate non-overlapping, non-glued regions for gripping in the Instron machine jaws during the shear test. Press conditions used were 120° C. for 2-5 mins. Pressure: Pressed to stops (4 mm).

Testing was subsequently performed on an Instron test machine. The mechanical property determined was the shear strength.

The glue formulation of example 2 was used.

Results

DH 0.7:

| Veneer number | Shear strength (MPa) |
| --- | --- |
| 1 | 5.1 |
| 2 | 4.8 |
| 3 | 5.3 |
| 4 | 4.2 |
| 5 | 7.1 |
| 6 | 5.3 |
| 7 | 4.7 |
| Mean: | 5.2 |

Comparative shear testing was performed on a glue formulation produced using SPI hydrolysed to DH 2.5, with total 20% solids content.

DH 2.5:

| Veneer number | Shear strength (MPa) |
| --- | --- |
| 1 | 1.4 |
| 2 | 2.0 |
| 3 | 1.2 |
| 4 | 1.5 |
| 5 | 1.3 |
| 6 | 1.4 |
| Mean: | 1.5 |

Conclusion

The above results show that even a DH of 2.5 results in a much lower bonding strength that compared to a DH of 0.7.

Example 5

Increased solids contents

Soy Protein Isolate (SPI) was utilized to produce formulations with higher protein solids contents. Focus was on preparation of an increased solids protein base dispersion, partially hydrolysed using alkalase enzyme preparation. The subsequent hydrolysate was then used as a glue base and the formulation made and final viscosity was measured.

Methodology and results

Test work was performed at the 500 g scale. To start the formulation SPI (75 g) was added to 425 g water and brought to a partial solution/dispersion using an overhead mechanical stirrer. The mix was placed in a 65° C. water bath and the pH adjusted to 8.4 using 1 M NaOH solution. 13 μl of Alkalase endoprotease (supplied by Novozymes A/S) was added to the mix and hydrolysis was allowed to proceed for 30 minutes. During this time the relative viscosity (monitored using a BohlinVisco-88 dynamic plate viscometer) was observed to drop from 485 cps to 225 cps.

A further 75 g of fresh, unhydrolysed SPI was then added to the dispersion mix in 3 batches of 25 g each, to increase protein solids content to 30%.

After the first 25 g addition, Viscosity was observed to increase to 1700 cps, at which point a further 13 μl dose of alkalase was added to the mix and after 30 mins further hydrolysis, viscosity was observed to reduce to 700 cps. The addition of the 2$^{nd}$ and 3$^{rd}$ batches of 25 g of SPI raised viscosities towards 2000 cps in each case, after which addition of 50 µl and 100 µl of alkalase respectively and 30 mins hydrolysis at 65° C., reduced the viscosity in the final dispersion to 900 cps. At the end of the hydrolysis sequence, the enzyme was deactivated via heating of the mix (microwave treatment) to 80° C. and holding at that temperature for 2 minutes.

In a series of similar trials, protein solids contents from 28%-32% were achieved, with final dispersion viscosities varying between 800 cps-1350 cps. These viscosities translate to dispersions that can are mobile enough for pumping, stirring, mixing and spraying.

The average DH after this procedure was estimated to be in the range 0.7-1.

By way of comparison, at 30% dry solids content, the unmodified SPI produces a stiff paste that cannot be readily stirred and does not flow. Viscosities in excess of 15,000 cps.
Test Glue formulation The higher concentration preparations were used to formulate the base glue as follows:

100 g samples were taken for make-up and to these were added, with stirring:
Sodium silicate (Bollerup Jensen nr. 36; with 34% dry solids): 50 g
Sodium peroxide: 1.2 g
Saturated lime (calcium Hydroxide) solution: 10 g Glue was applied to Wood strips/blocks (5 cm×2.5 cm×0.5 cm)—at a loading of approximately 200 g/m³ and pairs were glued together with curing in an oven at 120 C for 45 minutes, under a 3 kg weight.

Sample results are shown in the table below:

| Soy Protein solids content (hydrolysed), water dispersion | Internal Bond Strength "IB"(N/mm²) (mean, 5 determinations) | Final Visc of make-up protein dispersion (cps) | Visc of glue formulation (32-34% solids) prior to application (cps) |
| --- | --- | --- | --- |
| 30% | 0.85 | 900 | 1250 |
| 32% | 0.79 | 1019 | 1300 |

ABES Tests
Formulations were prepared as follows:
From powdered non-hydrolysed SPI and
From SPI hydrolysed (to DH=0.7), then gently dried (50° C.) dried and milled
Formulation:

| Component | Mass | Solid content by weight in liquid dispersion (%) | Solid content "in dry solids" (%) |
| --- | --- | --- | --- |
| SPI (hydrolysed/unhydrolyzed) | 15 g | 14.2 | 57 |
| Na Water glass | 30 g | 28.4 (dry silicate 8.8) | 35.4 |
| water | 50 g | | |
| Lime (Calcium Hydroxide) solution (saturated) | 10 g | 9.5 | 1.9 |
| Sodium Peroxide | 0.75 g | 0.7 | 2.9 |

At a temperature of 50° C., the water was placed in a beaker with mechanical stirring and SPI, or hydrolysed, dried, SPI, was added, to form a dispersion. Up to 50% of the water glass was added to ease dispersion, followed by the remainder of the water glass and the mix stirred for 10-15 minutes.

The Na Per was dissolved in the lime solution and this was added to the dispersed protein/water glass mix, with further stirring for 5 minutes.

The prepared glue was applied to small wood veneer pieces within the Automated Bond Evaluation System ("ABES") set-up and glue bonding performance evaluated systematically. The machine has a pair of platens that can be heated and controlled to a particular temperature for glue curing, and grips that can pull the bond to measure failure load. The press, cool and pull cycle is automated and the load-displacement profile during the pull is collected by computer. Glue bond sheer strengths can be conveniently monitored using the technique, allowing fast comparisons with industry standard glues.

Curing at 2 different temperatures was particularly examined: 120° C. and 140° C. for three test formulations
Formulation 4.1
Press temperature 120° C., Adhesive spread rate 200 g/m2

| Time [s] | Failure force [N] | Area [mm2] | Strength [Mpa] |
| --- | --- | --- | --- |
| 20 | 261 | 86 | 3.034883721 |
| 40 | 541.6 | 86 | 6.297674419 |
| 60 | 579.2 | 86 | 6.734883721 |
| 90 | 657.3 | 86 | 7.643023256 |
| 120 | 601.1 | 86 | 6.989534884 |

Press temperature 140° C., Adhesive spread rate 200 g/m2

| Time [s] | Failure force [N] | Area [mm2] | Strength [Mpa] |
| --- | --- | --- | --- |
| 20 | 504.5 | 86 | 5.86627907 |
| 40 | 682.5 | 86 | 7.936046512 |
| 60 | 677.5 | 86 | 7.877906977 |
| 90 | 666 | 86 | 7.744186047 |

Formulation 4.2
Press temperature 120° C., Adhesive spread rate 200 g/m2

| Time [s] | Failure force [N] | Area [mm2] | Strength [Mpa] |
| --- | --- | --- | --- |
| 20 | 367.5 | 86 | 4.273255814 |
| 40 | 479.5 | 86 | 5.575581395 |
| 60 | 535.5 | 86 | 6.226744186 |
| 90 | 570.5 | 86 | 6.63372093 |
| 120 | 521.5 | 86 | 6.063953488 |

Press temperature 140° C., Adhesive spread rate 200 g/m2

| Time [s] | Failure force [N] | Area [mm2] | Strength [Mpa] |
| --- | --- | --- | --- |
| 20 | 414.5 | 86 | 4.819767442 |
| 40 | 555 | 86 | 6.453488372 |
| 60 | 552 | 86 | 6.418604651 |

Formuation 2.1
Press temperature 120° C., Adhesive spread rate 200 g/m2

| Time [s] | Failure force [N] | Area [mm2] | Strength [Mpa] |
| --- | --- | --- | --- |
| 20 | 288 | 86 | 3.348837209 |
| 40 | 633 | 86 | 7.360465116 |
| 60 | 738.5 | 86 | 8.587209302 |
| 90 | 881.5 | 86 | 10.25 |
| 120 | 817 | 86 | 9.5 |

Press temperature 140° C., Adhesive spread rate 200 g/m2

| Time [s] | Failure force [N] | Area [mm2] | Strength [Mpa] |
|---|---|---|---|
| 20 | 586.5 | 86 | 6.819767442 |
| 40 | 770.5 | 86 | 8.959302326 |
| 60 | 750.5 | 86 | 8.726744186 |
| 90 | 759 | 86 | 8.825581395 |

In summary, formulations with hydrolyzed protein tested on the "ABES" gave veneer glues of very high shear strengths, at least that that expected from a PF resin and almost 3 times that for a UF. A curing time around 60-120 seconds appears sufficient with the best results around 90-120 seconds. This was considered a very positive trial outcome.

Example 6

Concentrated samples of alkalase hydrolysed SPI were produced, which were not dried, but up-concentrated using stirred evapouration (50° C.) towards 30% solids contents. These were two main runs, (as earlier described), using the dosages of alkalase to produce DH=0.7 and DH 2-2.5.

These were substituted into the main base glue formulation, with necessary adjustments to water content.

Glue formulation used:

30 g SPI+70 g water (ie 100 g of up-concentrated solution)
50 g Na water glass (containing 17 g dry solids, 33 g water)
1.5 g Sodium peroxide
10 g saturated Calcium Hydroxide solution.

This approximates to a 43-44% solids content glue base

Glue was applied to Wood strips/blocks (5 cm×2.5 cm×0.5 cm) and pairs were glued together with curing in an oven at 120 C for 1 hour, under a 3 kg weight. Internal Bond strength ("IB") was determined using an Instron mechanical test machine.

Results

IB values are the mean of 5 test samples:

| Protein: SPI, 30% solids | Mean IB (N/mm2) | Glue prep viscosity (cps) |
|---|---|---|
| DH = 0.7 | 0.85 | 650 |
| DH > 2 | 0.25 | 230 |

The results again indicated that the higher degree of protein hydrolysis was seen to be detrimental to glue performance. However, in the case of the DH=0.7 based formulations, the viscosities were still appreciably lower than those using the unmodified protein, with no observed loss of bond strength.

Indeed at 30% protein derived solids contents (ie the proportion of solids content in the final liquid formulation due only to the added protein) in the case where a non-hydrolysed protein is used, a flowable, liquid glue cannot be achieved in a mix with water glass.

It should be noted, however, that the viscosities of the "up-concentrated" hydrolysates of course increased prior to final addition of water glass and the other ingredients. In the case of the DH 0.7 sample, this raised to around 550 cps. For the DH>2 material, this was close to 200 cps.

Example 7

Data showing that different protein sources are functional.

To verify that different protein sources can indeed function as an adhesive together with sodium silicate, different sources were tested.

Lupin Protein Concentrate:

| Component | Mass |
|---|---|
| LPC (64% protein) | 30 g |
| Na Water glass ("36") | 60 g |
| Water | 100 g |
| Lime solution | 10 g |
| Na per | 1.5 g |

This composition represents a protein dry solids content of less than 15% in the adhesive. The mix had an observed viscosity of 850 cps at 25° C.

For testing, glue was applied to Wood strips/blocks (5 cm×2.5 cm×0.5 cm) and pairs were glued together with curing in an oven at 120 C for 1 hour, under a 3 kg weight. Internal Bond strength ("IB") was determined using an Instron mechanical test machine.

The results were as follows. IB values are the mean of 5 test samples:

| Protein: LPC, <15% solids | Mean IB (N/mm2) | Glue prep viscosity (cps) |
|---|---|---|
| | 0.35 | 850 |

Pigs Blood Base

| Component | Mass |
|---|---|
| Pig Blood | 100 g |
| Na Water glass | 20 g |
| 10% EDTA | 15 g |
| Lime | 4 g |
| Ammonia | 4 g |

For testing, glue was applied to Wood strips/blocks (5 cm×2.5 cm×0.5 cm) and pairs were glued together with curing in an oven at 120 C for 1 hour, under a 3 kg weight. Internal Bond strength ("IB") was determined using an Instron mechanical test machine.

The results were as follows. IB values are the mean of 5 test samples:

| Protein: pigs blood | Mean IB (N/mm2) | Glue prep viscosity (cps) |
|---|---|---|
| | 0.85 | 450 |

Conclusion

These results show that alternative protein sources can indeed be used in combination with metal silicates to produce a glue. Similar improvements with hydrolysed protein are expected.

Example 8

Different metal silicate compositions are function e.g. K silicates.

Potassium silicate has also been tested and shows similar results as with sodium silicate.

Example 9

Effect of Lime and na Peroxidase

Adhesives without na peroxide and/or without lime has also been tested. Such adhesives are also functional however adhesion is improved when an oxidant and a co-component is added.

The invention claimed is:

1. A process for at least partly adhering at least two parts together with a liquid adhesive composition, the process comprising:
   placing a liquid adhesive composition having a solid content in the range of 15-80% (w/w) between at least two parts, wherein the liquid adhesive composition is obtained by:
      hydrolyzing a protein component to a degree of hydrolysis (DH) in the range of 0.4-0.7, as measured by the "pH stat" method; and
      mixing 10-50% (w/w) of the hydrolyzed protein component with 2-60% (w/w) of a metal silicate component; and
   pressing the at least two parts together such that the at least two parts are at least partly adhered together by the liquid adhesive composition.

2. The process according to claim 1, wherein said two parts are selected from the group consisting of plywood, particle board, chip board, medium density fibreboard (MDF), LDF, HDF, oriented strand board (OSB), Veneer, laminated veneer lumber (LVL), laminated strand lumber (LSL), and any combination thereof.

3. The process according to claim 1, further comprising curing said at least partly adhered at least two parts for a period of at least 1minute at a temperature in the range 50-200° C.

4. The process according to claim 1, wherein the liquid adhesive composition comprises an exogenic protein hydrolyzing component.

5. The process according to claim 1, wherein the metal silicate component is selected from the group consisting of sodium silicate, potassium silicate and lithium silicate.

6. reviously Presented) The process according to claim 1, wherein the degree of hydrolysis is the average degree of hydrolysis of the protein component.

7. The process according to claim 1, wherein the liquid adhesive composition is substantially or completely free from formaldehyde.

8. The process according to claim 1, wherein the liquid adhesive composition has an Internal Bond Strength ("IB") of at least 0.5N/mm$^2$ (MPa).

9. The process according to claim 1, wherein the liquid adhesive composition has a viscosity below 1200 cP.

10. A process for at least partly adhering at least two parts together with a liquid adhesive composition, the process comprising:
    placing a liquid adhesive composition having a solid content in the range of 15-80% (w/w) between at least two parts, wherein the liquid adhesive composition further comprises:
       10-50% (w/w) of a hydrolyzed protein component having a degree of hydrolysis (DH) in the range of 0.4-0.7, as measured by the "pH stat" method; and
       2-60% (w/w) of a metal silicate component, wherein the hydrolyzed protein component and the metal silicate component of the liquid adhesive composition are mixed; and
    pressing the at least two parts together such that the at least two parts are at least partly adhered together by the liquid adhesive composition.

11. The process according to claim 10, wherein said two parts are selected from the group consisting of plywood, particle board, chip board, medium density fibreboard (MDF), LDF, HDF, oriented strand board (OSB), Veneer, laminated veneer lumber (LVL), laminated strand lumber (LSL), and any combination thereof.

12. The process according to claim 10, further comprising curing said at least partly adhered at least two parts for a period of at least 1 minute at a temperature in the range 50-200° C.

13. The process according to claim 10, wherein the liquid adhesive composition comprises an exogenic protein hydrolyzing component.

14. The process according to claim 10, wherein the metal silicate component is selected from the group consisting of sodium silicate, potassium silicate and lithium silicate.

15. The process according to claim 10, wherein the degree of hydrolysis is the average degree of hydrolysis of the protein component.

16. The process according to claim 10, wherein the liquid adhesive composition is substantially or completely free from formaldehyde.

17. The process according to claim 10, wherein the liquid adhesive composition has an Internal Bond Strength ("IB") of at least 0.5 N/mm$^2$ (MPa).

18. The process according to claim 10, wherein the liquid adhesive composition has a viscosity below 1200 cP.

* * * * *